United States Patent
Miyagawa et al.

(10) Patent No.: US 7,142,496 B2
(45) Date of Patent: Nov. 28, 2006

(54) OPTICAL INFORMATION RECORDING METHOD, DEVICE, AND RECORDING MEDIUM WITH PLURAL RECORDING LAYERS

(75) Inventors: Naoyasu Miyagawa, Kawanishi (JP); Kenichi Nishiuchi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 409 days.

(21) Appl. No.: 10/263,603

(22) Filed: Oct. 2, 2002

(65) Prior Publication Data
US 2003/0081523 A1 May 1, 2003

(30) Foreign Application Priority Data
Oct. 2, 2001 (JP) ............................. 2001-306120

(51) Int. Cl.
*G11B 7/0045* (2006.01)
(52) U.S. Cl. ................... 369/59.11; 369/47.53
(58) Field of Classification Search ............ 369/59.11, 369/47.5, 47.53; G11B 7/0045
See application file for complete search history.

(56) References Cited

U.S. PATENT DOCUMENTS

| | | | |
|---|---|---|---|
| 4,450,553 A | | 5/1984 | Holster et al. |
| 5,194,363 A | | 3/1993 | Yoshioka et al. |
| 5,602,814 A | * | 2/1997 | Jaquette et al. ............ 369/47.53 |
| 5,745,467 A | * | 4/1998 | Sakaue et al. ............ 369/59.11 |
| 6,190,750 B1 | * | 2/2001 | Wierenga et al. ............ 428/64.1 |
| 6,500,598 B1 | * | 12/2002 | Ichihara ................. 430/270.13 |
| 6,528,138 B1 | * | 3/2003 | Meinders et al. ............ 428/64.1 |
| 6,611,481 B1 | * | 8/2003 | Koishi et al. ............. 369/47.53 |
| 6,731,586 B1 | * | 5/2004 | Seo et al. .................... 369/116 |
| 6,801,240 B1 | * | 10/2004 | Abe et al. .................... 347/252 |
| 6,850,469 B1 | * | 2/2005 | Ogawa et al. ............ 369/47.22 |
| 2001/0012257 A1 | | 8/2001 | Suzuki et al. |
| 2002/0196324 A1 | | 12/2002 | Abe, et al. |

FOREIGN PATENT DOCUMENTS

| | | |
|---|---|---|
| EP | 1 058 240 | 9/2000 |
| EP | 1 045 378 | 10/2000 |
| JP | 54-130902 | 10/1979 |
| JP | 4-52188 | 2/1992 |
| JP | 2000-260060 | 9/2000 |
| JP | 2000-311346 | 11/2000 |
| JP | 2003-109217 | 4/2003 |
| WO | 01/16947 | 3/2001 |

* cited by examiner

*Primary Examiner*—A M Psitos
(74) *Attorney, Agent, or Firm*—Hamre, Schumann, Mueller & Larson, P.C.

(57) ABSTRACT

A plurality of types of recording pulse control rules for which the recording pulse waveform is determined according to the information signals to be recorded are stored in advance in an optical disk. When recording to the optical disk, information is recorded using a recording pulse where, due to the focused laser beam, the temperature in the recording layer cools more rapidly at a second information recording layer closer to the side where light is incident than at a first information recording layer farther away from the side where light is incident.

26 Claims, 6 Drawing Sheets

OPTICAL INFORMATION RECORDING METHOD, DEVICE, AND RECORDING MEDIUM WITH PLURAL RECORDING LAYERS

BACKGROUND OF THE INVENTION

1. Field of the Invention

The present invention relates to optical information recording media having a plurality of information recording layers, and an optical information recording method and optical information recording and reproducing devices for recording information thereon.

2. Description of the Related Art

Recent years have witnessed robust developments in optical disks capable of recording and reproducing information signals such as video and audio signals. Among these, optical disks on which two information recording layers are deposited so as to double the recording capacity are already commercially available as read-only DVDs (Digital Versatile Disks). As mentioned in JP 54-130902A, for example, the front recording layer, seen from the side from which the light source is incident, of such optical disks having a plurality of information recording layers is made semitransparent, so that a sufficient amount of light is allowed to reach the recording layers that are farther from the side from which the light is incident.

Phase-change type optical disks are one type of optical disk media capable of high-density recording. Data are recorded on phase-change optical disks by focusing the laser light to a beam spot less than 1 μm in diameter and directing this laser light onto the revolving disk to heat and melt the recording film. The temperature that the recording film reaches and how it cools differs depending on the intensity of the recording laser, and the recording film is phase changed between crystalline and amorphous states.

When the intensity of the laser light is high (referred to as the "peak power level"), the recording film is heated above its melting point and melted and subsequently cools quickly, thereby becoming amorphous. When the laser light is medium intensity (referred to as the "bias power level"), the recording film is kept above the temperature at which it crystallizes but below its melting point, and therefore it is crystallized. Amorphous areas are called marks and crystallized areas are called spaces. The method of recording data by assigning information to the length of the marks and spaces is called "mark-edge recording." With phase-change optical disks, the recording film can be melted at the peak power level to form marks, regardless of whether the recording film is amorphous or crystalline, and therefore direct overwriting, where old data are erased and new data are recorded simultaneously with a single beam spot, is possible.

Reproduction is carried out by irradiating a laser light weak enough not to cause the recording film to change phase and detecting the intensity of the reflected light by a photodetector. The material used for the recording film and how it is configured with the protection layer allows the reflectance of the amorphous mark portions to be significantly different from the reflectance of the crystalline space portions, so that the difference in the amount of light that is reflected by the mark portions and the space portions can be detected to obtain signals for reproducing the data information.

Numerous proposals have been made for using such phase-change optical disks in the two-layer optical disks described above. For example, JP 2000-311346A proposes to provide the laser light at an ideal recording power for each recording layer because the recording layers differ from one another. In another proposal, JP 2000-260060A teaches a technique for adopting a crystallization promotion film and an optical enhancement film, so that a stable change between amorphous and crystalline states can be generated so as to record information without employing a reflective film on the front recording layer.

However, the prior art mentioned in JP 54-130902A primarily addresses read-only applications, and lacks sufficient investigation into rewritable media with light transmission, absorbance, and reflectance properties adequate for practical applications. The technology disclosed in JP 2000-311346A merely uses recording pulses having identical patterns with respect to a plurality of recording layers and optimizing the peak power at each layer. Furthermore, with the technology that is disclosed in JP 2000-260060A, there is the problem that the optical disk structure becomes complex, and as a consequence additional manufacturing steps are required.

The present invention was derived in light of the foregoing problems, and it is an object thereof to provide an optical information recording medium having a plurality of rewritable information recording layers and to which information signals can be favorably recorded, and a method and a device for favorably recording information signals on an optical information recording medium.

SUMMARY OF THE INVENTION

In order to achieve the above object, an optical information recording method according to the present invention is an optical information recording method in which information signals are recorded on an optical information recording medium provided with N information recording layers (where N is an integer of 2 or more), each having a recording layer that is subject to a physical state change due to local temperature changes caused by a focused light beam. The method includes a step of selecting a recording pulse control rule that corresponds to an information recording layer to be recorded from a plurality of recording pulse control rules for which recording pulse waveforms are determined respectively, and a step of recording information signals on the recording layer of the optical information recording medium by modulating an intensity of the light beam in correspondence with the recording pulse that is determined by the selected recording pulse control rule. Of the N information recording layers, if a layer farthest from the side of incidence is regarded as a first information recording layer and layers progressively closer to the side of light incidence are regarded as second to N-th information recording layers, then the recording pulse control rule that is selected when recording to the second to the N-th information recording layers corresponds to a recording pulse waveform that, if employed for recording to information recording layers having identical thermal properties, results in a temperature change of the recording layer that is steeper during cooling than the recording pulse control rule that is selected when recording to the first information recording layer.

An optical information recording and reproducing device according to the present invention is an optical information recording and reproducing device for recording information signals on an optical information recording medium provided with N information recording layers (where N is an integer of 2 or more) each having a recording layer that is subject to a change in its physical state due to local temperature changes caused by the focused light beam. The device is provided with a rule selection portion for selecting, from a plurality of recording pulse control rules for which recording pulse waveforms are determined respectively, a recording pulse control rule that corresponds to an information recording layer to be recorded, and an optical recording portion for recording information signals on the recording layer of the optical information recording medium by emitting a light beam, the intensity of which is modulated to correspond to the recording pulse that is determined by the selected recording pulse control rule. Of the N information recording layers, if a layer farthest from the side of light incidence is regarded as a first information recording layer and layers progressively closer to the side of incidence are regarded as second to N-th information recording layers, then when recording to the second to the N-th information recording layers, the rule selection portion selects a recording pulse control rule that, if employed for recording to information recording layers having identical thermal properties, results in a temperature change of the recording layer due to the focused light of the light beam that is steeper during cooling than the recording pulse control rule that is selected when recording to the first information recording layer.

An optical information recording medium according to the present invention is an optical information recording medium provided with N information recording layers (where N is an integer of 2 or more) each having a recording layer that is subject to a change in its physical state due to local temperature changes caused by focused light beam, and on which information signals are recorded by modulating an intensity of the laser beam. The medium is provided with a control data region in which information of recording pulse control rules which determine the recording pulse waveforms for modulating the light beam have been stored in advance, and of the N information recording layers, if a layer farthest from the side of light incidence is regarded as a first information recording layer and layers progressively closer to the side of incidence are regarded as second to N-th information recording layers, then a recording pulse control rule employed for the second to the N-th information recording layers, if employed for information recording layers having identical thermal properties, results in a more rapid temperature change in the recording layer due to the focused light of the light beam during cooling than the recording pulse control rule that is employed for the first information recording layer.

DESCRIPTION OF THE PREFERRED EMBODIMENTS

Hereinafter, embodiments of the present invention are described in detail with reference to the accompanying drawings. The following embodiment is described using as the optical information recording medium an optical disk having two information recording layers and employing a phase-change type recording material, where recording is performed by changing the effective reflectance.

Figure 1:
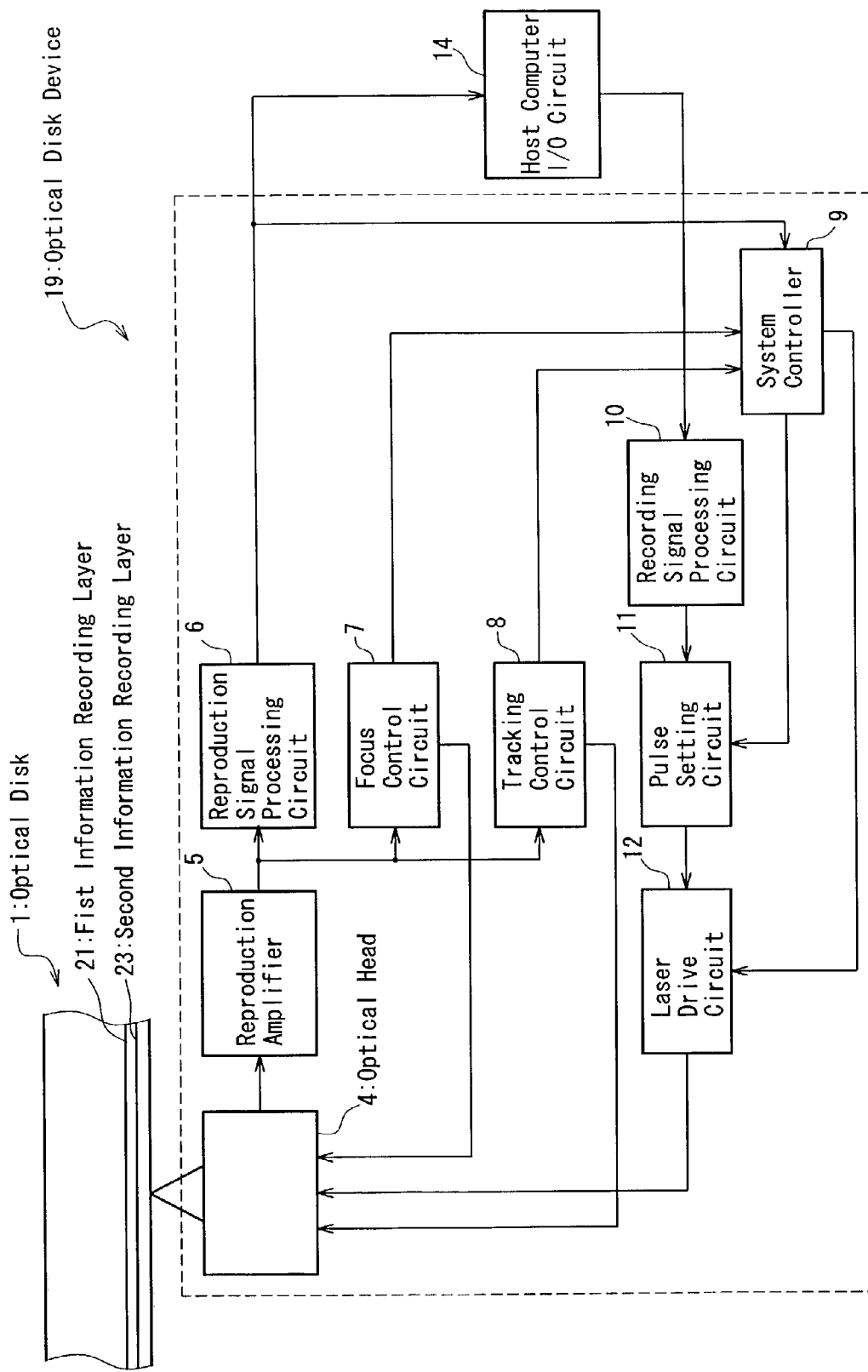
FIG. 1 is a block diagram showing the configuration of an optical disk device employing an optical information recording and reproducing method according to an embodiment of the invention.

FIG. 1 shows the configuration of an optical disk device according to an embodiment of the present invention. An optical disk device 19 records and reproduces information using an optical disk 1. The optical disk 1 is provided with a first information recording layer 21 and a second information recording layer 23. Information tracks are formed in each information recording layer. Data are recorded and reproduced through the irradiation of a laser from an optical head 4.

The optical disk device 19 is provided with the optical head 4, a reproduction amplifier 5, a reproduction signal processing circuit 6, a focus control circuit 7, a tracking control circuit 8, a system controller 9, a recording signal processing circuit 10, a pulse setting circuit 11, and a laser drive circuit 12.

The optical head 4 irradiates a laser light at reproduction intensity onto the first or the second information recording layer of the optical disk 1 by way of a semiconductor laser and an objective lens not shown in the drawings. The optical head 4 also receives laser light that has been reflected from the optical disk 1.

The reproduction amplifier 5 amplifies light detection signals that are output from the optical head 4 and outputs these as reproduction signals. The reproduction signal processing circuit 6 for example waveform equalizes, binarizes, synchronizes, demodulates, and decodes the reproduction signals that it receives from the reproduction amplifier 5 and either outputs these to an external host computer 14 as digital data such as video, audio, or computer data, or outputs these signals to the outside as analog video/audio signals via a DA converter not shown in the drawings.

The focus control circuit 7 controls the position of the spot of the laser that is irradiated from the optical head 4 onto the first information recording layer 21 or the second information recording layer 23, and the tracking control circuit 8 controls the position of the spot on the information tracks.

The information signal processing circuit 10 receives data to be recorded such as video, audio, or computer data from the host computer 14, encodes and modulates the data, and then outputs the data as binarized data. The pulse setting circuit 11 converts the binarized data into recording pulses in correspondence with a preferable conversion rule and outputs the recording pulses. The laser drive circuit 12 outputs a drive current to the semiconductor laser of the optical head 4 based on the recording pulses that are received, so that the optical head 4 emits laser light at the intensity for recording.

The system controller 9 obtains address information indicating the current position of the laser spot from the reproduction data that are output by the reproduction signal processing circuit, and also outputs control signals to the focus control circuit 7 and the tracking control circuit 8 so as to position the laser spot onto the information track of a desired information layer. The system controller 9 also outputs a control signal to the laser drive circuit 12 so that the optical head 4 irradiates laser light at the light intensity for reproducing or for recording. Additionally, the system controller 9 outputs a control signal to the pulse setting circuit 11 so that the pulse setting circuit 11 selects different modulation rules to correspond to the type of information recording layer.

The host computer 14 is external to the optical disk device 19, and inputs/outputs information signals and control data such as digital video and audio data and computer data.

Figure 2:
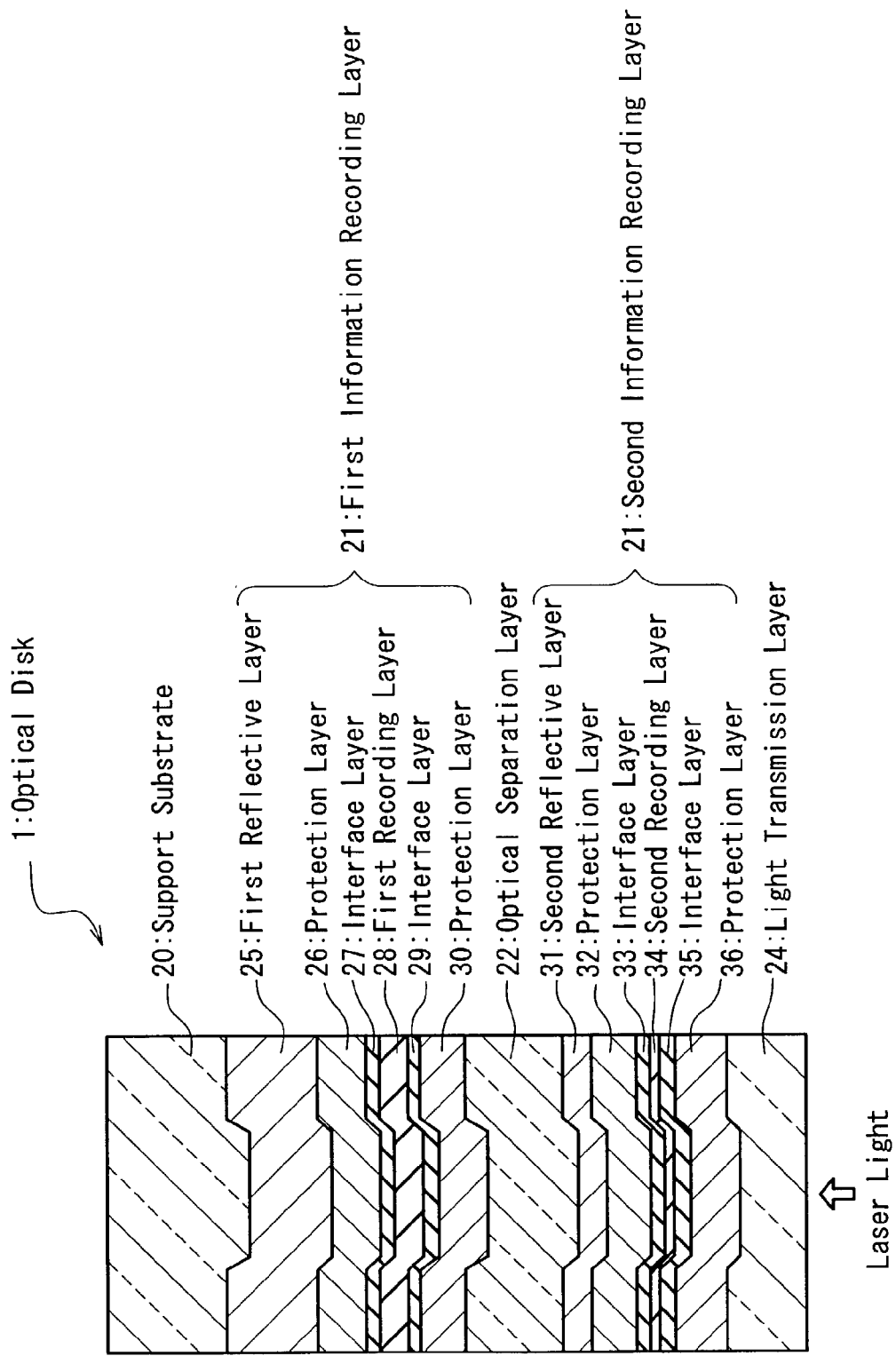
FIG. 2 is a cross-sectional view taken in the radial direction, which schematically shows the layered structure of an optical disk used in an embodiment of the invention.

FIG. 2 is a cross-sectional view in the radial direction schematically showing the layered structure of the optical disk 1 that is employed in an embodiment of the present invention. The optical disk has been provided with two information recording layers. As shown in the drawing, the optical disk includes a first information recording layer 21, an optical separation layer 22, a second information recording layer 23, and an optical transmission layer 24 sequentially deposited onto a support substrate 20. The two information recording layers 21 and 23, with the optical separation layer 22 provided interposed between them, are each made of a plurality of optical thin films. Information is recorded onto the information recording layers 21 and 23.

The first information recording layer 21 is provided by sequentially depositing a first reflective layer 25, a protection layer 26, an interface layer 27, a first recording layer 28, an interface layer 29, and a protection layer 30. The second information recording layer 23 is provided by sequentially depositing a second reflective layer 31, a protection layer 32, an interface layer 33, a second recording layer 34, an interface layer 35, and a protection layer 36. The laser light for recording and reproducing is incident from the side of the optical transmission layer 24.

The support substrate 20 is made of polycarbonate, a resin sheet such as PMMA, a UV curable resin, a glass substrate, or inorganic materials. On the surface of the substrate, continuous grooves (guide grooves, tracks) are formed in spirals or concentric circles. After the first information recording layer 21 is formed on the support substrate 20, the optical separation layer 22 having a surface covered by spiral or concentric circle-shaped continuous grooves (guide grooves, tracks) is formed through a 2P method, and the second information recording layer 23 is formed on the optical separation layer 22. The optical transmission layer 24 is then provided through spin coating or as a resin sheet, for example.

The material for the protection layers 26, 30, 32, and 36 is preferably both physically and chemically stable, that is, having a melting point and a softening temperature that are higher than those of the material that is adopted for the first recording layer 28 and the second recording layer 34, and does not form a solid solution with the material of the recording layers. The protection layers may be made of a dielectric such as $Al_2O_3$, $SiO_x$, $Ta_2O_5$, $MoO_3$, $WO_3$, $ZrO_2$, ZnS, $AlN_x$, BN, $SiN_x$, TiN, ZrN, $PbF_2$, or $MgF_2$, or a suitable combination thereof. Also, the protection layers 26 and 30 and the protection layers 32 and 36 can be formed of different materials, with the benefit that there is an increased degree of freedom in the thermal and optical disk design. Of course, they also can be formed of the same material.

The interface layers 27, 29, 33, and 35 are thin films of nitride or carbide that are provided in order to inhibit diffusion between the elements constituting the layers adjacent thereto, and are for example made of a material that can be expressed by the general formula X—N or X—O—N.

Although it is preferable that X is a component including at least one element from Ge, Cr, Si, Al, and Te, this is not essential. By providing these interface layers, the elements constituting the first and/or second recording layers 28 and 34 are kept from diffusing into the elements constituting the protection layers 26, 30, 32, and 36, which are dielectric layers, and thus the ability to repeatedly record and erase is improved. The effects of interface layers are described in detail in JP 04-52188A, for example.

The material of the first recording layer 28 and the second recording layer 34 can be a substance that experiences a structural change between crystalline and amorphous states, and for example can be a phase-change material incorporating Te, In or Se as a primary component. Primary components of phase-change materials well known in the art include Te—Sb—Ge, Te—Ge, Te—Ge—Sn, Te—Ge—Sn—Au, Sb—Se, Sb—Te, Sb—Se—Te, In—Te, In—Se, In—Se—Te, In—Sb, In—Sb—Se, and In—Se—Te. The first and second recording layers 28 and 34 ordinarily are formed in an amorphous state, and when they absorb energy such as a laser light they become crystalline, and as a result their optical constants (refractive index n, attenuation coefficient k) are changed.

The optical separation layer 22 is an intermediate layer that is disposed between the first information recording layer 21 and the second information recording layer 23, and is provided such that when the first information recording layer or the second information recording layer are reproduced, it diminishes the effects of reproduction signals from the other information layer to the extent that they can be ignored. The thickness of the optical separation layer 22 is ordinarily not less than 10 μm and not more than 50 μm, and is preferably not less than 20 μm and not more than 40 μm. The material employed for the optical separation layer 22 can be a material that is transparent with respect to the wavelength of the laser light that is irradiated to the first information recording layer 21 in order to record or reproduce signals. The material of the optical separation layer 22 for example can be an epoxy-based UV curable resin or a sheet-shaped double-sided adhesive tape for adhering to the optical disk.

The first reflective layer 25 and the second reflective layer 31 may be made of a metallic element such as Au, Al, Ni, Fe, Cr, or Ag, or an alloy thereof. The function of the first reflective layer 25 is to increase the efficiency of light absorption with the first recording layer 28, and thus is preferably provided. Although it is preferable that the second reflective layer 31 is provided in order to ensure the amount of light for reproducing signals of the second information recording layer 23, it also must pass a portion of the laser light to enable recording and reproducing with respect to the first information recording layer 21. The second reflective layer 31 can be omitted, but if it is not provided, then the material and the thickness of the remaining layers of the second information recording layer 23 must be selected so that an adequate amount of reflected light can be obtained from the second information recording layer 23.

The aforementioned first recording layer 28, the second recording layer 34, the protection layers 26, 30, 32, and 36, the interface layers 27, 29, 33, and 35, the first reflective layer 25, and the second reflective layer 31, for example, are each normally formed through electron beam deposition, sputtering, ion plating, CVD, or laser sputtering.

Next, once again referring to FIG. 1, the operation of the optical disk device 19 configured as above shall be described.

First, when the optical disk 1 has been loaded, the host computer 14 sends a command indicating the reproduction mode to the system controller 9. The system controller 9 outputs control signals in correspondence with the reproduction mode command to a spindle motor that is not shown, the focus control circuit 7, the tracking control circuit 8, and the laser drive circuit 12. Once the spindle motor has begun revolving the optical disk 1, the laser drive circuit 12 is put into reproduction mode and irradiates laser light at a constant reproduction power level from the optical head 4. The system controller 9 sends a control signal to a transfer motor not shown in the drawings, which moves the optical head 4 in the radial direction of the disk so that the beam spot falls onto the control data region of the optical disk 1.

Next, position control of the focus direction of the beam spot is performed. In correspondence with a control signal from the system controller 9, the focus control circuit 7 selects either the first or the second information recording layer and moves the beam spot onto that information control layer. Then, the tracking control circuit 8 controls the position in the disk radial direction (tracking direction). The control for positioning the beam spot in the focus direction is achieved through common focus control method such as astigmatism method and the control for positioning the beam spot in the tracking direction is achieved through common tracking control method such as push-pull method, and thus a description of these control processes is omitted. These controls allow the beam spot to follow the information track.

Recording pulse control rule information regarding the ideal recording pulse waveform for each information recording layer is stored in the control data region in advance as depressed pits, meandering guide grooves, or amorphous recording marks, and the laser light modulated by these is returned to the optical head 4. The recording pulse control rules are rules for which at least one of the number, height, width, and output timing of the recording pulses have been determined in order to write recording mark of a predetermined length to the information track according to the length of the period of continuous 1 bits or 0 bits of the binarized data to be recorded. The recording pulse control rules also are called the recording strategy. The recording pulse control rule information stored in the control data region of each information recording layer may be a recording pulse control rule per se suitable for the information recording layer, or alternatively, may be a number or the like for identify the recording pulse control rule suitable for the information recording layer. In the latter case, numbered recording pulse control rules are stored in the optical disk device 19 beforehand, and upon recording, a recording pulse control rule corresponding to recording pulse control rule information read from the control data region of the target information recording layer is selected from the recording pulse control rules stored in the optical disk device 19. In the control data region of each information recording layer, information of at least one recording pulse control rule suitable for the recording to the information recording layer may be stored.

The laser light that is modulated and returned from the optical disk 1 is received by the optical detector of the optical head 4 and converted into electrical signals. These signals are amplified by the reproduction amplifier 5 and then output to the reproduction signal processing circuit 6 as reproduction signals. The reproduction signal processing circuit 6 waveform equalizes, binarizes, synchronizes, demodulates, and decodes, for example, the analog reproduction signals to extract the control data, and then outputs the data to the system controller 9. The system controller 9 reads the above-described recording pulse control rules from a semiconductor memory or the like based on the control data that are obtained, and transmits information pertaining to the recording pulse control rules to the pulse setting circuit 11.

Figure 3:
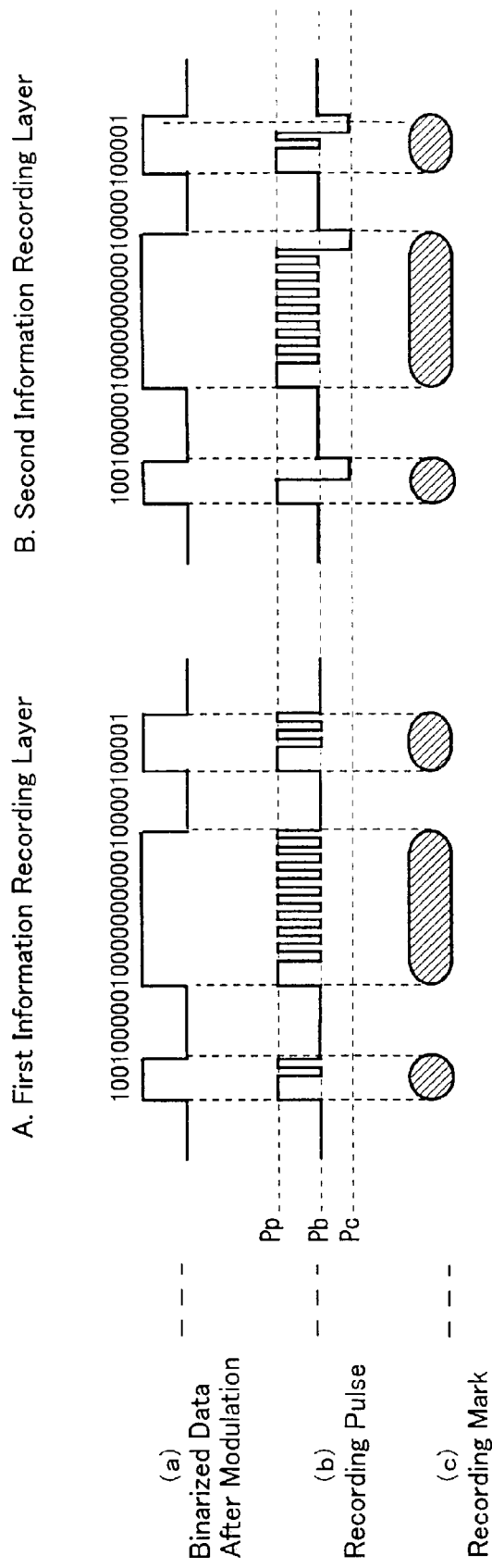
FIG. 3 is a diagram illustrating the recording pulse control rules for recording pulses in an embodiment of the invention.

Here, the recording pulse control rules according to this embodiment are described with reference to FIG. 3. In FIG. 3, (a) is a waveform diagram showing the record data that are input to the pulse setting circuit 11 as binary values, with the binary values indicating a high level and a low level. As described later, the period of the high level is expressed on the disk by marks and the period of the low level is expressed by spaces. In FIG. 3, (b) is a waveform diagram of the recording pulses that are output by the pulse setting circuit 11, and a single recording mark corresponds to one short pulse or a sequence of a plurality of short pulses. The period during a space is held at the level corresponding to the intensity Pb (the "bias power"). Next, of the pulse columns corresponding to each mark, the initial pulse at the intensity Pp (the "peak power") is called the first pulse, the remaining comb-shaped pulses (power Pp) are called sub-pulses, and the pulse at intensity Pc (the "cooling power") following the final sub-pulse is called the cooling pulse. The period between sub-pulses is maintained at a power intensity Pbo (the "bottom power level"), and here this is equivalent to the bias power Pb. In FIG. 3, (c) shows the recording marks formed in the recording layer, seen from above.

In FIG. 3, the left side (A) shows a case where information signals are recorded onto the first information recording layer, and the right side (B) shows a case where information signals are recorded onto the second information recording layer. The recording pulse control rules for recording the same binalized data are different in each case, and compared to the former case, the emission waveform of the latter case is such that, during recording, the material of the recording layer is heated to elevated temperatures by the laser light and then rapidly drops in temperature. That is, at (b) of FIG. 3, in the waveform on the left, the emission intensity is switched and changed between the bias power (Pb) and the peak power (Pp), which is higher than Pb, whereas in the waveform on the right side, an emission period at the cooling power (Pc), which is even lower than Pb, is added to the end of the first pulse or short pulses sequence. This pulse is called a cooling pulse. Thus, because the emission power drops down to the intensity Pc immediately after the intensity Pp, the drop in temperature from the high temperature state occurs more rapidly than in the case of the waveform on the left, which drops only as far as the power Pb.

The reason the recording pulse control rules differ in this way is described below. With optical disks having a plurality of information recording layers, it is imperative that the front information recording layer, seen from the side from which the laser light is incident, is made semitransparent so that light reaches the rear information recording layer. For that reason, the reflection layer or the recording layer of the front information recording layer ordinarily must be thin or removed. However, the reflective layer not only reflects laser light but also serves as a heat sink for rapidly returning a recording layer elevated in temperature to its normal temperature. Thus, if the reflective layer is thin or removed, then the heat-diffusion properties of the entire information recording layer are diminished. On the other hand, the rear information recording layer does not have to be semitransparent, and thus its reflective layer can be provided thick, and the heat-diffusing effect can be sufficiently increased. For that reason, in this embodiment, different recording pulse control rules are provided for the first information recording layer and the second information recording layer, and the light intensity immediately after the Pp pulse in the latter case can be significantly reduced over that of the former case. Consequently, the low heat-diffusion properties of the second information recording layer are compensated for and the cooling speed during recording is substantially equivalent in both cases, so that even if an identical recording layer material or layer structure is adopted, similar recording marks can be formed in either information recording layer. The emission intensity Pc can be determined in advance by taking into consideration the cooling speed that is required to form the recording marks and the heat-diffusion property of the second information recording layer 23.

Here, the operation of the optical disk device 19 for recording information to an information recording layer of the optical disk 1 is explained. The system controller 9 moves the optical head 4 so that the beam spot falls onto the track of the test write region in the target information recording layer of the optical disk 1. Next, the system controller 9 sends control signals to the recording signal processing circuit 10 and the pulse setting circuit 11 so that the test pattern data for test write in a learning process are output. Based on the drive pulse from the laser drive circuit 12, the optical head 4 emits laser light that has been modulated between the power levels and records marks onto the disk corresponding to the test pattern. When recording of the test pattern has finished, the system controller 9 shifts to the reproducing mode and sends control signals to the laser drive circuit 12 so that the intensity of the laser light that is emitted by the optical head 4 is dropped down to the reproduction power level. Then, the actuator of the optical head 4 is controlled so that the beam spot returns to the position where the test pattern has been recorded. The laser light that is emitted is modulated in accordance with the test pattern and then returned to the optical head 4, where it is received by the light detector and output as reproduction signals. The reproduction signal processing circuit 6 then waveform equalizes, binarizes, synchronizes, demodulates, and decodes, for example, the reproduction signals amplified by the reproduction amplifier 5. At the same time, the reproduction signal processing circuit 6 measures the modulation, the error rate, the synchronization jitter, or the edge shift, for example, of the reproduction signals. The test pattern is repeatedly recorded and reproduced as above while changing the emission intensity Pp and Pb, and when the modulation, the error rate or the jitter falls below a preferred threshold value, the system controller 9 ends the learning process.

In the learning process described above, when a test write is performed for the first time in a learning process of each information recording layer, the pulse setting circuit 11 employs a recording pulse control rule selected according to recording pulse control rule information read from the control data region of the foregoing information recording layer. During learning at the second information recording layer 23, a recording pulse control rule with which the recording layer is cooled more rapidly than the first information recording layer 21 is chosen. Also, when the result of recording and learning at the second information recording layer 23 is that the measured values such as the modulation, the error rate or the jitter fall outside the tolerance range, then another recording pulse control rule with which more rapid cooling occurs is selected, and the learning process is performed once again, or learning can be repeated in order starting from the recording pulse control rule with the most rapid cooling. Also, in learning, by also subjecting the time parameters (Tp, Ts, etc.) to a learning process, such as by fine-tuning the edge positions of the recording pulses in correspondence with the length of the target marks, the quality of the recording signals can be improved further. Additionally, the frequency properties can be optimized with a reproduction signal processing circuit such as an equalizer.

After the learning process has been performed to determine the intensity of the laser light for recording, a shift is made to the information signal recording mode. The system controller 9 notifies the recording signal processing circuit 10, the pulse setting circuit 11, and the laser drive circuit 12 that the device is in the information signal recording mode and moves the beam spot up to the information signal region of the target information recording layer in the optical disk 1. When the control for positioning the beam spot is finished, information signals to be recorded that are output from the host computer 14, such as information signals like digitized video or audio data or computer data, are transmitted to the laser drive circuit 12 as multi-pulse modulated data via the recording signal processing circuit 10 and the pulse setting circuit 11. Then, the laser drive circuit 12 drives the optical head 4 to emit a laser light. Thus, recording marks of appropriate lengths are recorded onto the optical disk 1.

On the other hand, the information signals are reproduced as follows. The laser light projected to the optical disk 1 is modulated by the recording marks and returns to the optical head 4, and then is transmitted to the reproduction signal processing circuit 6 via the reproduction amplifier 5. The reproduction signal control circuit 6 performs waveform equalization, binarization, synchronization, demodulatation, and error correction, and outputs the laser light signals to the host computer 14 as reproduction data.

Next, the device of FIG. 1 was used to record information signals on the optical disk of FIG. 2 and then reproduce those signals. A GaN-based semiconductor laser with a 400 nm wavelength was used as the laser light for recording and reproducing, and the objective lens of the optical head 4 was given an NA of 0.85. The information signals were modulated by 8–16, RLL (2, 10) modulation and recorded. Jitter was measured by binarizing the reproduction signals and then measuring the difference between these and the clock signals of the reproduction PLL, and the ratio of jitter to the standard clock period T was expressed in percent. Jitter was measured using the TA 520 made by Yokogawa Electric Corporation. The permissible value of jitter in the DVD standard is 9% or less, for example, and the present embodiment adopts this value as the standard permissible jitter value. The standard clock period T was set to 13.6 nsec, the recording and reproducing linear velocity was set to 5.0 m/s, and the shortest recording mark pitch was set to 0.20 μm. The optical disk 1 was fabricated as follows. A polycarbonate substrate with a 120 mm diameter and 1.1 mm thickness was adopted for the support substrate 20, and spiral shaped grooves with a 0.22 μm width, a 0.32 μm pitch, and a 22 nm depth were formed in the surface of the support substrate 20. The first information recording layer 21 was formed on the surface of the support substrate 20 by sequentially forming a 100 nm first reflective layer 25 made of AgPdCu, a 15 nm protection layer 26 made of ZnS—$SiO_2$, a 5 nm interface layer 27 made of GeN, a 12 nm first recording layer 28 made of GeSbTe, a 5 nm interface layer 29 made of GeN, and a 60 nm protection layer 30 made of ZnS—$SiO_2$. Next, the first recording layer 28 was initialized by irradiating it with a laser light to change it from an amorphous state into a crystalline state, after which the optical separation layer 22 was formed. The surfaces of the optical separation layer 22 was of identical groove-shape with the support substrate 20 by a stamping. Then, the second information recording layer 23 was formed by sequentially forming a 6 nm second reflective layer 31 made of AgPdCu, a 12 nm protection layer 32 made of ZnS—SiO$_2$, a 5 nm interface layer 33 made of GeN, a 6 nm second recording layer 34 made of GeSbTe, a 5 nm interface layer 35 made of GeN, and a 45 nm protection layer 36 made of ZnS—SiO$_2$. After the second information recording layer 23 was formed, the second recording layer 34 was irradiated by a laser light to change it from an amorphous to a crystalline state and initialize it. Finally, an optical transmission layer 24 made of polycarbonate was adhered using a UV curable resin. The combined thickness of the adhered portion and the optical transmission layer 24 was set to 85 μm and the thickness of the optical separation layer 22 was set to 30 μm. With the optical disk 1 according to this embodiment, signals can be rewritten to the first and second information recording layers 21, 23 at a Pp, Pb, and Pc of approximately 10, 4, and 4 mW and 8, 4, and 0.6 mW, respectively, and the reproduction power was approximately 0.6 mW. The optical disk configured as above has an approximately 20% reflectance at the first information recording layer 21 and an approximately 6% reflectance and an approximately 50% transmittance at the second information layer 23, which was favorable. Thus, the effective reflectivity of the first information recording layer through the second information recording layer was approximately 5%.

Table 1 shows the measured values of reproduction signal jitter for each information reproduction layer when information signals are recorded and reproduced under the above conditions. For the second information recording layer 23, a jitter of less than 9% could not be obtained when the recording waveform A shown in FIG. 3 was adopted, but a favorable jitter value of less than 9% was obtained when the recording waveform B was adopted. In contrast, for the first information recording layer 21, jitter less than 9% was obtained when the recording waveform A was adopted, but a jitter value higher than 9% was found when the recording waveform B was adopted.

TABLE 1

|  | First Information Recording Layer | Second Information Recording Layer |
| --- | --- | --- |
| Recording Waveform A | 8.8% | 11.5% |
| Recording Waveform B | 9.5% | 8.9% |

Figure 4:
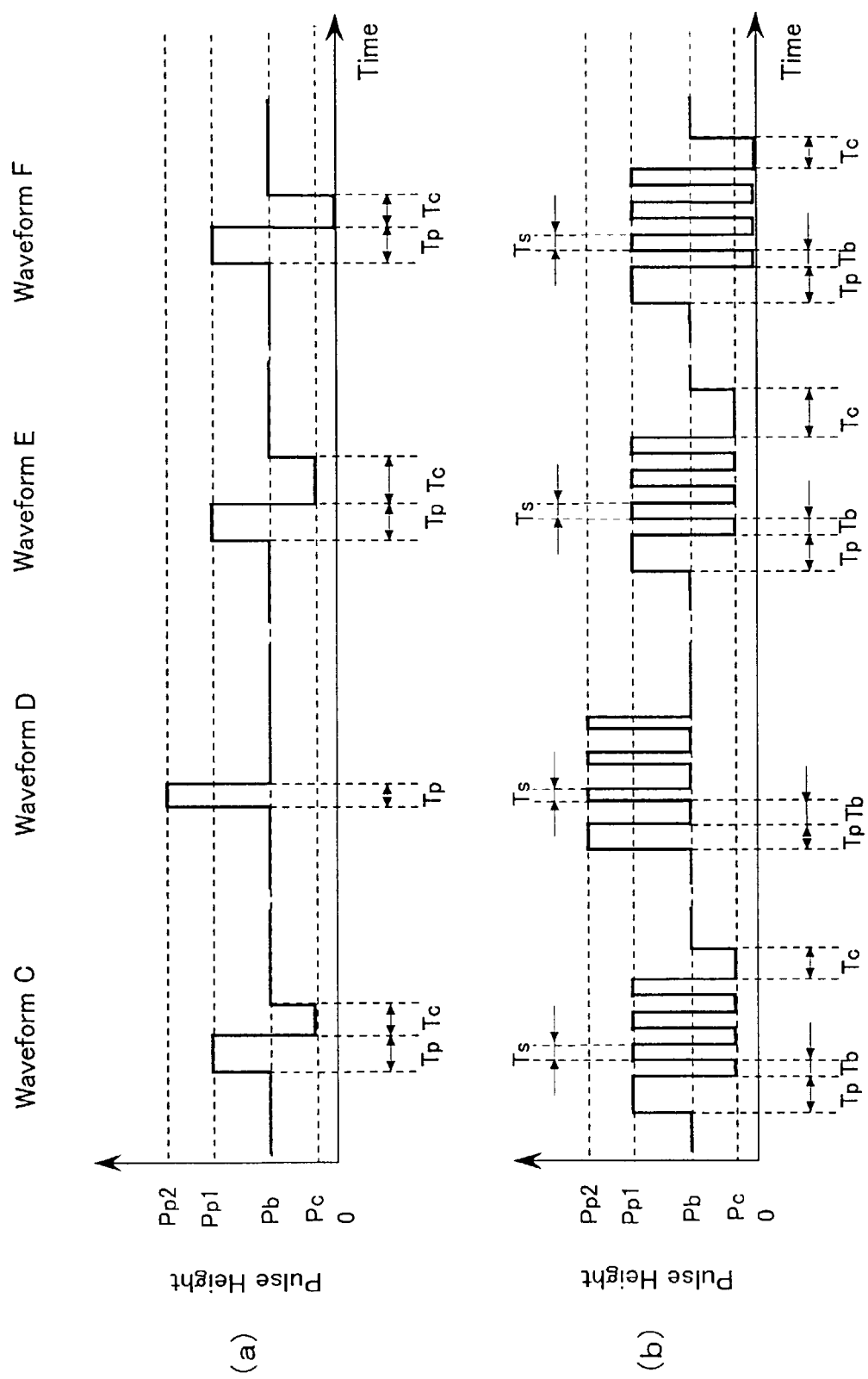
FIG. 4 is a waveform diagram showing other examples of recording pulse waveforms according to an embodiment of the invention.
Figure 5:
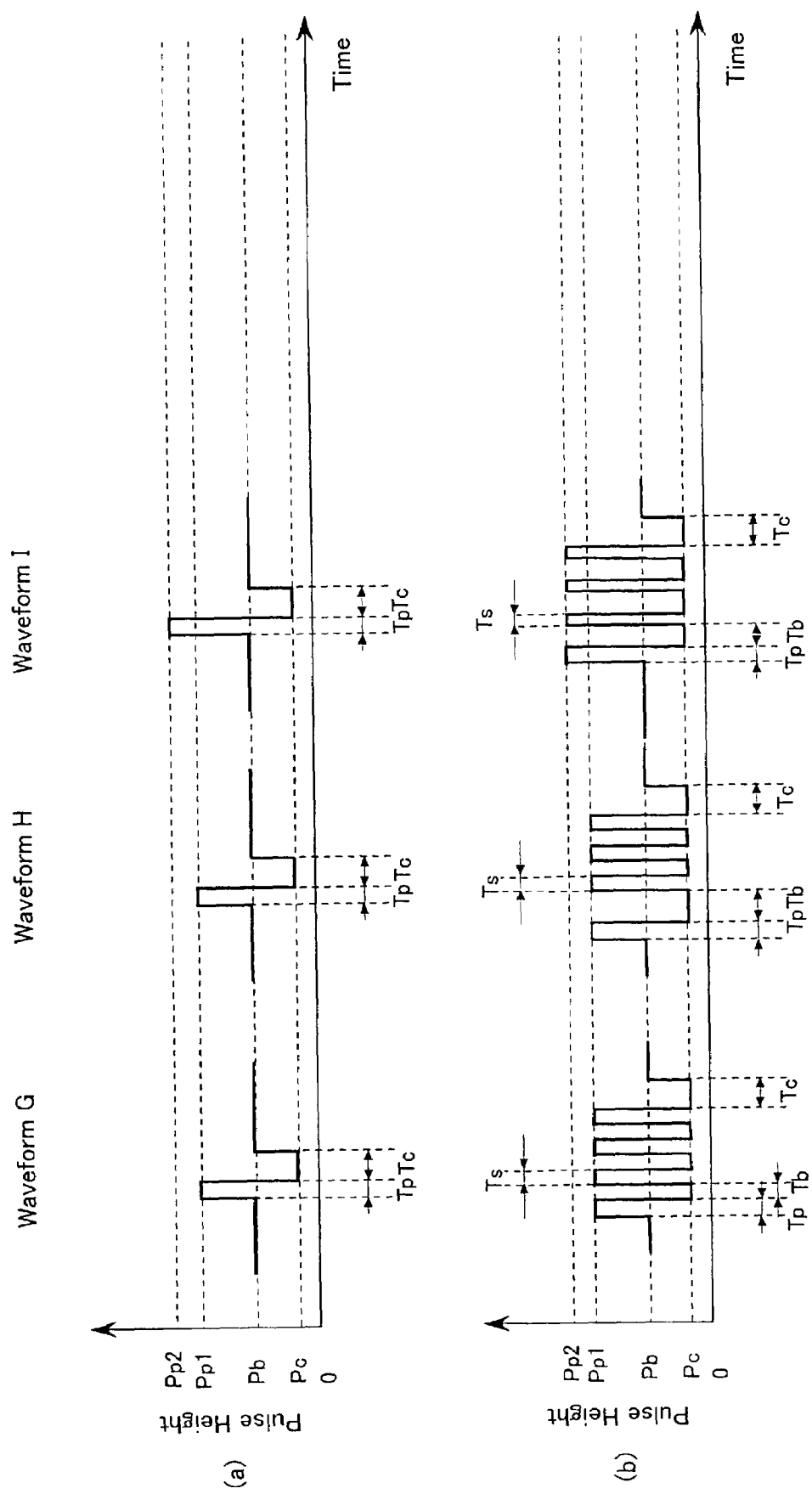
FIG. 5 is a waveform diagram showing other examples of recording pulse waveforms according to an embodiment of the invention.

FIGS. 4 and 5 are waveform diagrams illustrating other examples of recording pulse waveforms in this embodiment of the present invention. In these drawings, (a) shows the recording pulse corresponding to the shortest recording mark, and (b) shows the recording pulse corresponding to a relatively long recording mark. The examples C to I are each recording pulses based on different recording pulse control rules. These recording pulses have been designed so that in all cases cooling occurs more rapidly than with the recording pulse A shown in FIG. 3 when used with respect to the second information recording layer 23.

First, the waveform C is a waveform in which the power between sub-pulses of the recording pulse waveform B of FIG. 3 is dropped to Pc, which is lower than the bias power level Pb, so as to achieve more rapid cooling than the waveform B. Here, the length (time) of the first pulse and the cooling pulse are Tp and Tc, respectively, and the length (time) of the sub-pulse and the period between sub-pulses are Ts and Tb, respectively. The laser irradiation intensity, that is, the pulse height, is Pp1 at the first pulse and the sub-pulses, Pc at the cooling pulse and the period between sub-pulses, and Pb at other periods. In the waveform D, Tp and Ts are shorter than in the recording pulse waveform A of FIG. 3, and the pulse height Pp2 is higher than the peak power level Pp1 of the waveform A. Here, Tb is longer than in waveform A, and this boosts the cooling effect. Waveforms C and D were conceived so as to achieve a more rapid drop in temperature after the recording film is melted than in the case of waveform A. Therefore, by using these waveforms for the second information recording layer 23 and using the waveform A for the first information recording layer 21, information signals can be favorably recorded on either layer.

The waveform E of FIG. 4 has a longer Tc than the waveform C. Also, the waveform F has a lower cooling pulse height Pc and bottom pulse height Pbo than the waveform C. The waveform G in FIG. 5 has a narrower first pulse than the waveform C. The waveform H is identical to the waveform G except that the length of the bottom pulse immediately after the first pulse is longer. The waveform I is a waveform in which the period between sub-pulses in the waveform D is dropped down to Pc and a cooling pulse has been added. All of the above waveforms E, F, G, H, and I cool the recording film more rapidly than the waveform C. Consequently, the waveform C can be adopted for the first information layer 21 and any of the waveforms E, F, G, H, or I can be adopted for the second information recording layer 23. Additionally, waveforms with different cooling effects can be selected from these waveforms so that the pulse capable of more rapid cooling can be used with respect to the second information recording layer 23. In this case, a recording material or layer structure with relatively low thermal conduction efficiency can be adopted for the first information recording layer 21 as well, and as a result the degree of design freedom for the optical disk 1 is increased.

Table 2 shows an example of recording pulse control rule information to be stored in the control data region of the optical disk 1. Table 2 shows specific parameters of the recording pulses to be used for the first and second information recording layers 21, 23. In Table 2, Pp, Pb, Pc, Tp, Ts, Tb, and Tc are the same parameters as those appearing in FIGS. 3 to 5. The values of the Pp, Pb, and Pc columns indicate the height of the recording pulse and are the power of the laser light in mW, whereas Tp, Ts, Tb, and Tc indicate the width of the recording pulse in units of nsec. In Table 2, waveform A, that is, the recording pulse waveform expressed by the parameters in the upper columns of the Table 2, is adopted for the first information layer 21, and waveform B, that is, the recording pulse waveform expressed by the parameters in the lower columns of the Table 2, is adopted for the second information layer 23. Table 3 shows other examples of recording pulse control rule information. In Table 3, waveform G, that is, the recording pulse waveform expressed by the parameters in the upper columns of the Table 3, is adopted for the first information layer 21, and waveform I, that is, the recording pulse waveform expressed by the parameters in the upper columns of the Table 3, is adopted for the second information layer 23. It should be noted that Tp, Ts, Tb, and Tc can be represented by not only the absolute values of the pulse width but also as a multiple of the standard clock period (for example, 1T or 0.5T).

Also, instead of numerically storing each parameter of the waveforms in the control data region of the optical disk 1 as in the Tables 2 and 3, a unique number can be assigned to each recording pulse waveform, and by storing information on which waveform corresponds to which number within a memory on the device side, it is possible to store only the waveform numbers in the control data region of the optical disk 1.

TABLE 2

|  | Pp | Pb | Pc | Tp | Ts | Tb | Tc |
|---|---|---|---|---|---|---|---|
| First Information Recording Layer | 10 | 4 | 4 | 13.6 | 6.8 | 6.8 | 0 |
| Second Information Recording Layer | 10 | 4 | 0.6 | 13.6 | 6.8 | 6.8 | 13.6 |

TABLE 3

|  | Pp | Pb | Pc | Tp | Ts | Tb | Tc |
|---|---|---|---|---|---|---|---|
| First Information Recording Layer | 10 | 4 | 0.6 | 6.8 | 6.8 | 6.8 | 6.8 |
| Second Information Recording Layer | 10 | 4 | 0.6 | 6.1 | 5.4 | 7.5 | 9.6 |

According to the above, in the present embodiment, the emission pulse of the laser is switched with respect to the two information recording layers so that the emission pulse with which cooling occurs more rapidly is selected for the recording film of the second information recording layer, which has low heat diffusion properties, and as a result, recording marks can be favorably formed in an optical disk having two information recording layers. Thus, the recording quality for two-layer optical disks is improved.

It should be noted that the present embodiment was described with regard to an optical disk of a configuration where the thickness of the reflective layers is different for the first and the second information recording layers, as shown in FIG. 2. However, the present embodiment is of course not limited this configuration. For example, in order to increase the transmittance of the second information recording layer 23, the second reflective layer 31 can be removed entirely, or the second reflective layer 31 can have the same thickness but be made semitransparent by changing the material thereof.

Additionally, the recording pulse control rules are not limited to those shown in FIGS. 3–5, and it is only necessary that there are two recording pulse control rules and one of the rules obtains a recording pulse waveform where the temperature within the recording layer falls more rapidly after its temperature has been increased to its melting point than a waveform of the other rule. Additionally, although in the above embodiments the recording pulse control rule for each information recording layer is stored in the control data region of each information recording layer, it is possible that the recording pulse control rules for all information recording layers are stored in the control data region of any one of the information recording layers. This is preferable because the recording pulse control rules for all information recording layers can be obtained by one-time access to the control data region.

Further, the present embodiment was described using an optical disk provided with two information recording layers, but the basic principle set forth in this embodiment remains the same when applied to an optical disk having three or more information recording layers. That is, if an optical disk has three or more information recording layers, then the transmissivity of all layers except for the one farthest from the side of the optical disk on which the laser light is incident must be large. Consequently, as mentioned above, the reflective layers must be thin, which results in a drop in heat diffusivity. Thus, the recording pulse waveforms can be chosen so that the recording pulse that is used for all information recording layers other than the one that is farthest from the side that the laser light is incident results in more rapid cooling than the recording pulse that is employed for the farthest information recording layer from the side on which the laser is incident. By doing so, information signals can be recorded favorably with respect to all the information recording layers.

Figure 6:
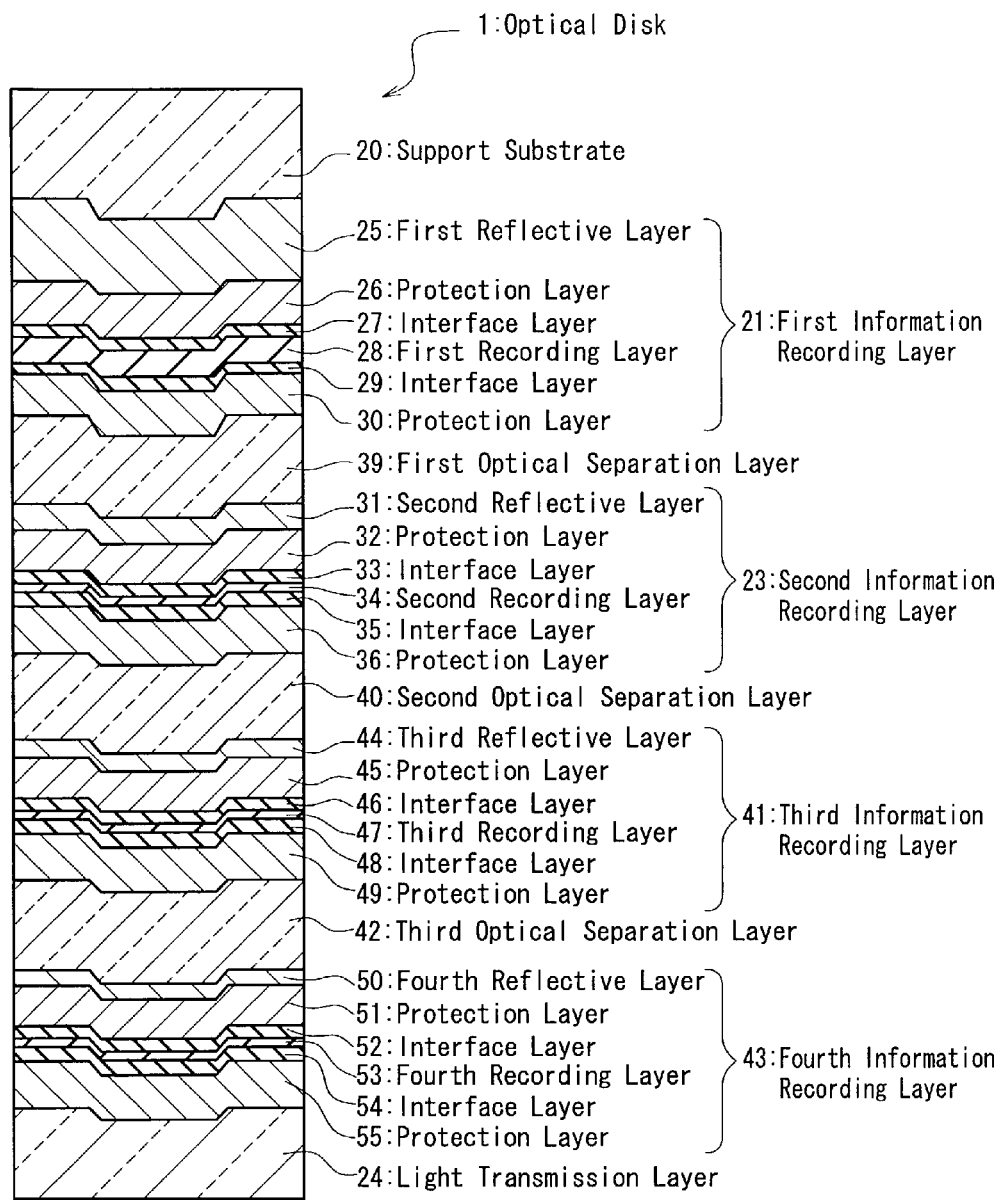
FIG. 6 is a cross-sectional view taken in the radial direction, which schematically shows the layered configuration of an optical disk employed in an embodiment of the invention.

As an example of the above, FIG. 6 shows an optical disk having four information recording layers. In FIG. 6, a first information recording layer 21, a first optical separation layer 39, a second information recording layer 23, a second optical separation layer 40, a third information recording layer 41, a third optical separation layer 42, a fourth information recording layer 43, and an optical transmission layer 24 are deposited sequentially onto a support substrate 20. Each of the four information recording layers 21, 23, 41, and 43, which are provided with the optical separation layers 39, 40, and 42 interposed between them, are made of a plurality of optical thin films. The first information recording layer 21 is provided by sequentially depositing a first reflective layer 25, a protection layer 26, an interface layer 27, a first recording layer 28, an interface layer 29, and a protection layer 30. The second information recording layer 23 is provided by sequentially depositing a second reflective layer 31, a protection layer 32, an interface layer 33, a second recording layer 34, an interface layer 35, and a protection layer 36. The third information recording layer 41 is provided by sequentially depositing a third reflective layer 44, a protection layer 45, an interface layer 46, a third recording layer 47, an interface layer 48, and a protection layer 49. The fourth information recording layer 43 is provided by sequentially depositing a fourth reflective layer 50, a protection layer 51, an interface layer 52, a fourth recording layer 53, an interface layer 54, and a protection layer 55. The laser light for recording and reproducing is incident from the optical transmission layer 24 side.

In the four-layer configuration shown in FIG. 6, the laser light must pass through three information recording layers 42, 40, and 39 and become incident on the information recording layer 21 that is farthest from the side on which the laser light is incident. Therefore, it is preferable that the transmissivity of the information recording layers becomes progressively increased towards the front layers. Also, it is preferable that a substantially equivalent amount of light is reflected from each information recording layer. To that end, the information recording layers are designed so that the reflectance is progressively increased towards the back layers. In the configuration shown in FIG. 2, the thickness of the second reflective layer 31 and the second recording layer 34 are both 6 nm, and in a conceivable configuration, one of the third reflective layer 44 and the third recording layer 47 is made even thinner in the third information recording layer 41, for example, the third recording layer 47 is set to 3 nm, so as to increase the transmissivity. Also, in another conceivable configuration, although the cooling properties are sacrificed, the third or fourth reflective layers can be removed in order to increase the transmissivity. Thus, it is preferable that the thickness of the reflective layers or recording layers becomes progressively thicker towards the back information recording layers and progressively thinner towards the front information recording layers. Consequently, the heat diffusivity progressively drop towards the front information recording layers, and thus sharper recording pulses are used. As an example, in the waveform I, the pulse width Tp or Ts can be narrowed progressively toward the front layers or the peak power Pp2 can be increased progressively toward the front layers. This leads to sharp changes in the light intensity during recording, and sufficient cooling speeds can be obtained in the recording layers even in the front information recording layers, so that sufficiently large recording marks can be formed.

It should be noted that if the first information layer has the most significant difference in thermal properties compared to the other information recording layers and the thermal properties of the second, third, and fourth information recording layers do not significantly differ from one another, then to the extent that recording pulses with steeper changes in laser light intensity are employed, it is of course possible to use substantially identical recording pulses for the other three information recording layers.

According to the present invention, the recording pulse control rules are selected in correspondence with the information recording layers and the recording pulse where cooling occurs most rapidly is selected for the information recording layer(s) with low heat-diffusion properties, so that information signals can be favorably recorded on an optical information recording medium having a plurality of information recording layers.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording method in which information signals are recorded on an optical information recording medium provided with N information recording layers (where N is an integer of 2 or more) each having a recording layer that is subject to a change in its physical state due to local temperature changes caused by a focused light beam, the method comprising:
    a step of selecting a recording pulse control rule, from a plurality of recording pulse control rules for which waveforms of a recording pulse are determined respectively, in correspondence with an information recording layer to be recorded, and
    a step of recording information signals on the recording layer by modulating an intensity of the light beam in correspondence with the recording pulse that is determined by the selected recording pulse control rule;
    wherein at least one of the plurality of recording pulse control rules corresponds to a recording pulse waveform to modulate the intensity of the light beams at the mark periods between a peak power level sufficient to melt the recording layer, a bias power level sufficient to crystallize the recording layer, a cooling power level and a bottom power level, and alternately switch the intensity of the light beam between the peak power level and the bottom power level in at least a portion of the mark period; and
    wherein of the N information recording layers, if a layer farthest from the side of light incidence is regarded as a first information recording layer and layers progressively closer to the side of light incidence are regarded as second to N-th information recording layers, then at least one of the recording pulse control rules that is selected when recording to the second to the N-th information recording layers corresponds to a recording pulse waveform where the sum of the length of the bottom power level periods is longer than the sum of the length of the bottom power level periods of the recording pulse waveform that is employed for the first information recording layer.

2. The optical information recording method according to claim 1, wherein at least one of the second to the N-th information recording layers has identical thermal properties with the first information recording layer.

3. The optical information recording method according to claim 1, wherein the recording layers of the optical information recording medium are formed by a phase-change type material that undergoes a change between amorphous and crystalline states.

4. The optical information recording method according to claim 1, wherein the pulse corresponding to the cooling power level is located at least immediately after the pulse columns of the peak power level and the bias power level.

5. The optical information recording method according to claim 1, wherein at least one of the recording pulse control rules that is selected when recording to the second to the N-th information recording layers corresponds to a recording pulse waveform having a peak power level period that is shorter than the peak power level period of the recording pulse waveform that is employed for the first information recording layer.

6. An optical information recording method in which information signals are recorded on an optical information recording medium provided with N information recording layers (where N is an integer of 2 or more) each having a recording layer that is subject to a change in its physical state due to local temperature changes caused by a focused light beam, the method comprising:
    a step of selecting a recording pulse control rule, from a plurality of recording pulse control rules for which waveforms of a recording pulse are determined respectively, in correspondence with an information recording layer to be recorded, and
    a step of recording information signals on the recording layer by modulating an intensity of the light beam in correspondence with the recording pulse that is determined by the selected recording pulse control rule;
    wherein at least one of the plurality of recording pulse control rules corresponds to a recording pulse waveform to modulate the intensity of the light beams at the mark periods between a peak power level sufficient to melt the recording layer, a bias power level sufficient to crystallize the recording layer, a cooling power level and a bottom power level, and alternately switch the intensity of the light beam between the peak power level and the bottom power level in at least a portion of the mark period; and
    wherein of the N information recording layers, if a layer farthest from the side of light incidence is regarded as a first information recording layer and layers progressively closer to the side of light incidence are regarded as second to N-th information recording layers, then at least one of the recording pulse control rules that is selected when recording to the second to the N-th information recording layers corresponds to a recording pulse waveform having a bottom power level that is lower than the bottom power level of the recording pulse waveform that is employed for the first information recording layer.

7. The optical information recording method according to claim 6, wherein at least one of the second to the N-th information recording layers has identical thermal properties with the first information recording layer.

8. The optical information recording method according to claim 6, wherein the recording layers of the optical information recording medium are formed by a phase-change type material that undergoes a change between amorphous and crystalline states.

9. The optical information recording method according to claim 6, wherein the pulse corresponding to the cooling power level is located at least immediately after the pulse columns of the peak power level and the bias power level.

10. An optical information recording method in which information signals are recorded on an optical information recording medium provided with N information recording layers (where N is an integer of 2 or more) each having a recording layer that is subject to a change in its physical state due to local temperature changes caused by a focused light beam, the method comprising:
a step of selecting a recording pulse control rule, from a plurality of recording pulse control rules for which waveforms of a recording pulse are determined respectively, in correspondence with an information recording layer to be recorded, and
a step of recording information signals on the recording layer by modulating an intensity of the light beam in correspondence with the recording pulse that is determined by the selected recording pulse control rule;
wherein at least one of the plurality of recording pulse control rules corresponds to a recording pulse waveform to modulate the intensity of the light beams at the mark periods between a peak power level sufficient to melt the recording layer, a bias power level sufficient to crystallize the recording layer, a cooling power level and a bottom power level, and alternately switch the intensity of the light beam between the peak power level and the bottom power level in at least a portion of the mark period; and
wherein of the N information recording layers, if a layer farthest from the side of light incidence is regarded as a first information recording layer and layers progressively closer to the side of light incidence are regarded as second to N-th information recording layers, then at least one of the recording pulse control rules that is selected when recording to the second to the N-th information recording layers corresponds to a recording pulse waveform having a plurality of bottom power level periods with respect to a predetermined mark, and an initial period of the plurality of bottom power level periods is longer than an initial period of a bottom power level periods in a recording pulse waveform that is employed when recording the predetermined mark to the first information recording layer.

11. The optical information recording method according to claim 10, wherein at least one of the second to the N-th information recording layers has identical thermal properties with the first information recording layer.

12. The optical information recording method according to claim 10, wherein the recording layers of the optical information recording medium are formed by a phase-change type material that undergoes a change between amorphous and crystalline states.

13. The optical information recording method according to claim 10, wherein the pulse corresponding to the cooling power level is located at least immediately after the pulse columns of the peak power level and the bias power level.

14. An optical information recording and reproducing device for recording information signals on an optical information recording medium provided with N information recording layers (where N is an integer of 2 or more) each having a recording layer that is subject to changes in its physical state due to local temperature changes caused by a focused light beam, the device comprising:
a rule selection portion for selecting, from a plurality of recording pulse control rules for which recording pulse waveforms are determined respectively, a recording pulse control rule that corresponds to an information recording layer to be recorded, and
an optical recording portion for recording information signals on the recording layer by emitting a light beam, the intensity of which is modulated in correspondence with the recording pulse waveform that is determined by the selected recording pulse control rule;
wherein at least one of the plurality of recording pulse control rules corresponds to a recording pulse waveform to modulate the intensity of the light beams at the mark periods between a peak power level sufficient to melt the recording layer, a bias power level sufficient to crystallize the recording layer, a cooling power level and a bottom power level, and alternately switch the intensity of the light beam between the peak power level and the bottom power level in at least a portion of the mark period; and
wherein of the N information recording layers, if a layer farthest from the side of light incidence is regarded as a first information recording layer and layers progressively closer to the side of light incidence are regarded as second to N-th information recording layers, then at least one of the recording pulse control rules that is selected by the rule selection portion when recording to the second to the N-th information recording layers corresponds to a recording pulse waveform where the sum of the length of the bottom power level periods is longer than the sum of the length of the bottom power level periods of the recording pulse waveform that is employed for the first information recording layer.

15. The optical information recording and reproducing device according to claim 14, wherein at least one of the second to the N-th information recording layers has identical thermal properties with the first information recording layer.

16. The optical information recording and reproducing device according to claim 14, wherein the recording layers of the optical information recording medium are formed by a phase-change type material that undergoes a change between amorphous and crystalline states.

17. The optical information recording and reproducing device according to claim 14, wherein the pulse corresponding to the cooling power level is located at least immediately after the pulse columns of the peak power level and the bias power level.

18. The optical information recording and reproducing device according to claim 14, wherein at least one of the recording pulse control rules that is selected when recording to the second to the N-th information recording layers corresponds to a recording pulse waveform having a bottom power level that is lower than the bottom power level of the recording pulse waveform that is employed for the first information recording layer.

19. An optical information recording and reproducing device for recording information signals on an optical information recording medium provided with N information recording layers (where N is an integer of 2 or more) each having a recording layer that is subject to changes in its physical state due to local temperature changes caused by a focused light beam, the device comprising:
a rule selection portion for selecting, from a plurality of recording pulse control rules for which recording pulse waveforms are determined respectively, a recording pulse control rule that corresponds to an information recording layer to be recorded, and an optical recording portion for recording information signals on the recording layer by emitting a light beam, the intensity of which is modulated in correspondence with the recording pulse waveform that is determined by the selected recording pulse control rule;

wherein at least one of the plurality of recording pulse control rules corresponds to a recording pulse waveform to modulate the intensity of the light beams at the mark periods between a peak power level sufficient to melt the recording layer, a bias power level sufficient to crystallize the recording layer, a cooling power level and a bottom power level, and alternately switch the intensity of the light beam between the peak power level and the bottom power level in at least a portion of the mark period; and wherein of the N information recording layers, if a layer farthest from the side of light incidence is regarded as a first information recording layer and layers progressively closer to the side of light incidence are regarded as second to N-th information recording layers, then at least one of the recording pulse control rules that is selected by the rule selection portion when recording to the second to the N-th information recording layers corresponds to a recording pulse waveform having a bottom power level that is lower than the bottom power level of the recording pulse waveform that is employed for the first information recording layer.

20. The optical information recording and reproducing device according to claim 19, wherein at least one of the second to the N-th information recording layers has identical thermal properties with the first information recording layer.

21. The optical information recording and reproducing device according to claim 19, wherein the recording layers of the optical information recording medium are formed by a phase-change type material that undergoes a change between amorphous and crystalline states.

22. The optical information recording and reproducing device according to claim 19, wherein the pulse corresponding to the cooling power level is located at least immediately after the pulse columns of the peak power level and the bias power level.

23. An optical information recording and reproducing device for recording information signals on an optical information recording medium provided with N information recording layers (where N is an integer of 2 or more) each having a recording layer that is subject to changes in its physical state due to local temperature changes caused by a focused light beam, the device comprising:

a rule selection portion for selecting, from a plurality of recording pulse control rules for which recording pulse waveforms are determined respectively, a recording pulse control rule that corresponds to an information recording layer to be recorded, and an optical recording portion for recording information signals on the recording layer by emitting a light beam, the intensity of which is modulated in correspondence with the recording pulse waveform that is determined by the selected recording pulse control rule;

wherein at least one of the plurality of recording pulse control rules corresponds to a recording pulse waveform to modulate the intensity of the light beams at the mark periods between a peak power level sufficient to melt the recording layer, a bias power level sufficient to crystallize the recording layer, a cooling power level and a bottom power level, and alternately switch the intensity of the light beam between the peak power level and the bottom power level in at least a portion of the mark period; and wherein of the N information recording layers, if a layer farthest from the side of light incidence is regarded as a first information recording layer and layers progressively closer to the side of light incidence are regarded as second to N-th information recording layers, then at least one of the recording pulse control rules that is selected by the rule selection portion when recording to the second to the N-th information recording layers corresponds to a recording pulse waveform having a plurality of bottom power level periods with respect to a predetermined mark, and an initial period of the plurality of bottom power level periods is longer than an initial period of a bottom power level periods in a recording pulse waveform that is employed when recording the predetermined mark to the first information recording layer.

24. The optical information recording and reproducing device according to claim 23, wherein at least one of the second to the N-th information recording layers has identical thermal properties with the first information recording layer.

25. The optical information recording and reproducing device according to claim 23, wherein the recording layers of the optical information recording medium are formed by a phase-change type material that undergoes a change between amorphous and crystalline states.

26. The optical information recording and reproducing device according to claim 23, wherein the pulse corresponding to the cooling power level is located at least immediately after the pulse columns of the peak power level and the bias power level.

* * * * *

UNITED STATES PATENT AND TRADEMARK OFFICE
CERTIFICATE OF CORRECTION

| | |
|---|---|
| PATENT NO. | : 7,142,496 B2 |
| APPLICATION NO. | : 10/263603 |
| DATED | : November 28, 2006 |
| INVENTOR(S) | : Miyagawa et al. |

It is certified that error appears in the above-identified patent and that said Letters Patent is hereby corrected as shown below:

Page 1, second column, line 3: "B1" should read --B2--.
Page 1, second column, line 4: "B1" should read --B2--.
Page 1, second column, line 6: "B1" should read --B2--.
Page 1, second column, line 7: "B1" should read --B2--.
Page 1, second column, line 8: "B1" should read --B2--.

Signed and Sealed this

Tenth Day of July, 2007

JON W. DUDAS
*Director of the United States Patent and Trademark Office*